(12) United States Patent
Cipriano et al.

(10) Patent No.: US 10,876,556 B2
(45) Date of Patent: Dec. 29, 2020

(54) DOUBLE-ENDED DUAL ATTACHED FASTENER

(71) Applicant: GM Global Technology Operations LLC, Detroit, MI (US)

(72) Inventors: Steven Cipriano, Chesterfield Township, MI (US); Bradley J. Blaski, Sterling Heights, MI (US); Richard C. Janis, Grosse Pointe Woods, MI (US); Pei-Chung Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 206 days.

(21) Appl. No.: 15/935,767

(22) Filed: Mar. 26, 2018

(65) Prior Publication Data

US 2019/0293100 A1    Sep. 26, 2019

(51) Int. Cl.
 | | |
 |---|---|
 | *F16B 5/02* | (2006.01) |
 | *F16B 19/08* | (2006.01) |
 | *F16B 25/10* | (2006.01) |
 | *F16B 37/06* | (2006.01) |
 | *F16B 19/05* | (2006.01) |

(52) U.S. Cl.
CPC ............ *F16B 5/0275* (2013.01); *F16B 19/05* (2013.01); *F16B 19/086* (2013.01); *F16B 25/106* (2013.01); *F16B 37/061* (2013.01); *F16B 5/02* (2013.01)

(58) Field of Classification Search
CPC .......... F16B 5/02; F16B 5/0275; F16B 19/05; F16B 19/086; F16B 25/106; F16B 37/061

USPC ................................ 411/166, 171, 388, 389
See application file for complete search history.

(56) References Cited

U.S. PATENT DOCUMENTS

| | | | | |
|---|---|---|---|---|
| 2,741,289 A | * | 4/1956 | Grow | F16B 39/282 411/185 |
| 3,640,326 A | | 2/1972 | Brown | |
| 3,897,713 A | * | 8/1975 | Gugle | F16B 5/0275 411/389 |
| 4,015,504 A | * | 4/1977 | Rosan, Sr. | F16B 25/0015 411/389 |
| 4,223,585 A | | 9/1980 | Barth et al. | |
| 4,459,073 A | * | 7/1984 | Muller | B23P 19/062 29/243.519 |
| 5,613,815 A | * | 3/1997 | Muller | B23P 19/062 411/179 |
| 6,102,642 A | * | 8/2000 | Kawashita | F16B 15/00 411/387.3 |

(Continued)

FOREIGN PATENT DOCUMENTS

| | | |
|---|---|---|
| CN | 102954085 A | 3/2013 |
| CN | 107630905 A | 1/2018 |

*Primary Examiner* — Roberta S Delisle

(57) ABSTRACT

A double ended dual attached fastener includes a first portion having a stud bolt, a second portion configured to anchor to a panel member, and a flange nut partitioning the first end and the second end. The flange nut includes a flat interior annular surface facing the second portion. The flange nut includes a plurality of radially spaced weld projections extending toward the second portion. The weld projection includes a material that amendable to form a weld joining the flange nut to a panel member through which the second portion is inserted. The second portion defines a fastener selected from a group consisting of a self-tapping friction screw, a self-piercing rivet, and a swage bolt.

15 Claims, 3 Drawing Sheets

(56) References Cited

U.S. PATENT DOCUMENTS

| | | | | |
|---|---|---|---|---|
| 6,491,487 B1 * | 12/2002 | Wojciechowski | .... | B23P 19/062 |
| | | | | 29/432.2 |
| 6,592,311 B2 * | 7/2003 | Wojciechowski | .... | B23P 19/062 |
| | | | | 411/107 |
| 6,802,682 B2 | 10/2004 | Stevenson et al. | | |
| 7,568,871 B2 * | 8/2009 | Chopp, Jr. | ............ | F16B 5/0275 |
| | | | | 411/389 |
| 8,641,343 B2 * | 2/2014 | Mitrovic | ............... | F16B 37/122 |
| | | | | 411/338 |
| 8,998,549 B2 * | 4/2015 | Pimper | ................. | F16B 37/061 |
| | | | | 411/171 |
| 9,303,675 B2 * | 4/2016 | Brunner | ................ | F16B 11/006 |
| 2007/0053766 A1 * | 3/2007 | Lin | ....................... | F16B 5/0275 |
| | | | | 411/389 |
| 2014/0079507 A1 | 3/2014 | Brunner et al. | | |

* cited by examiner

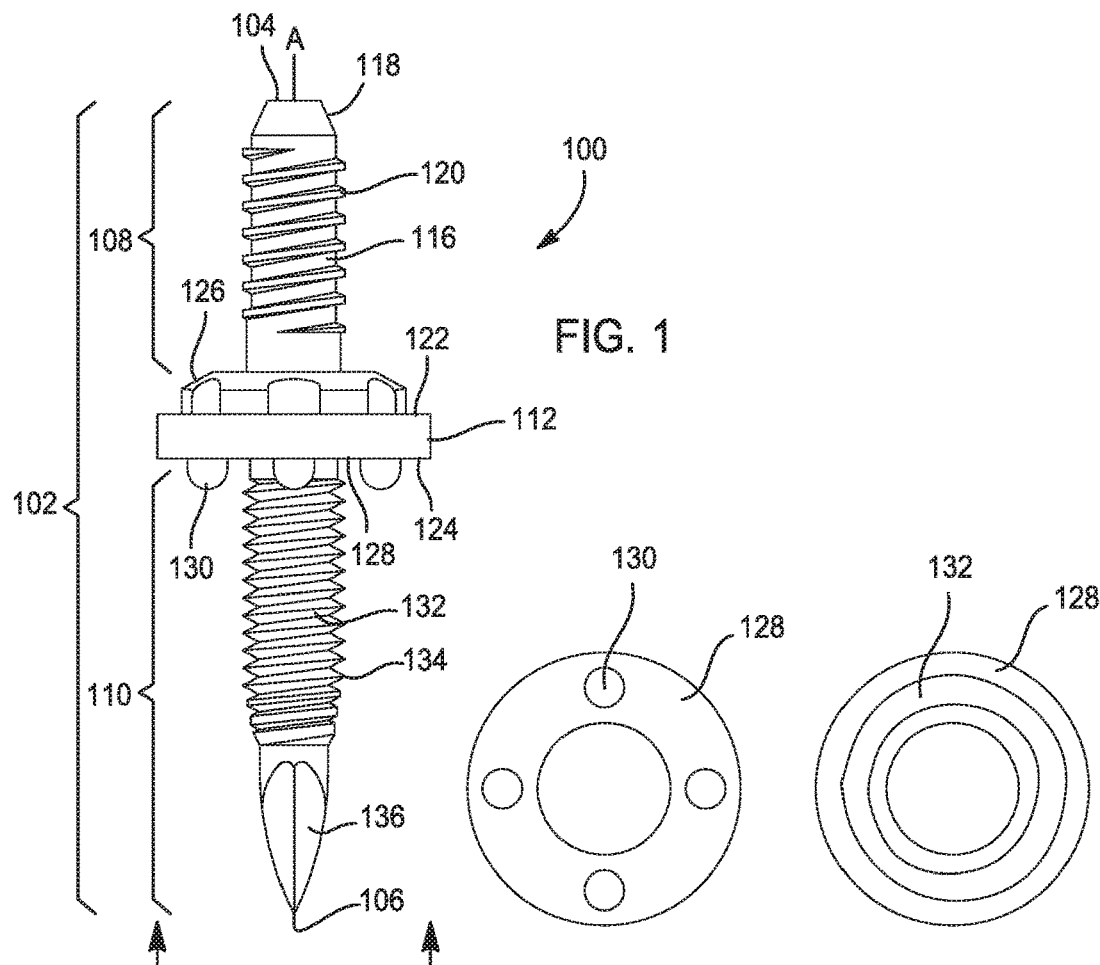
FIG. 1
FIG. 2A
FIG. 2B
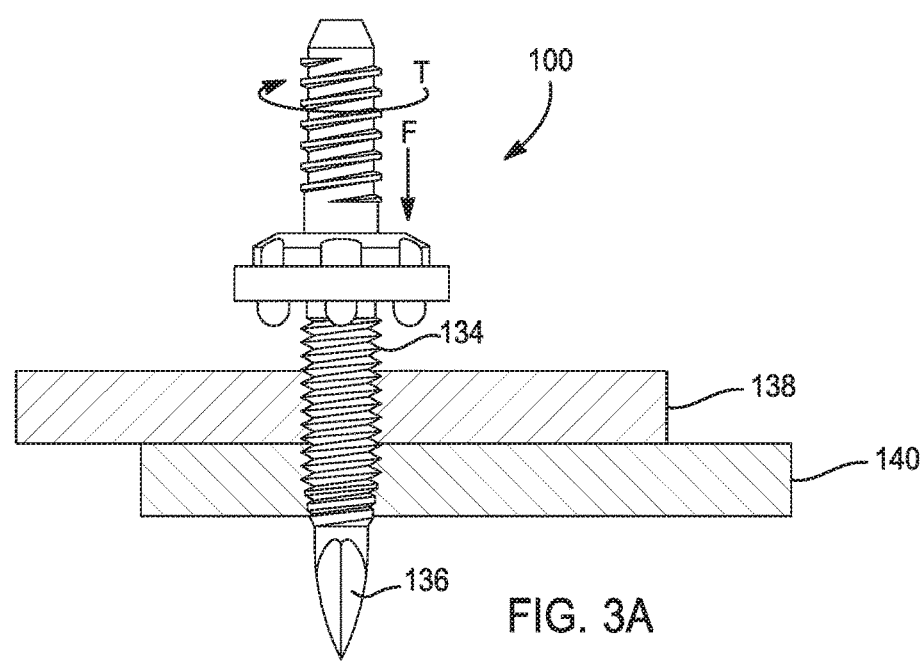
FIG. 3A

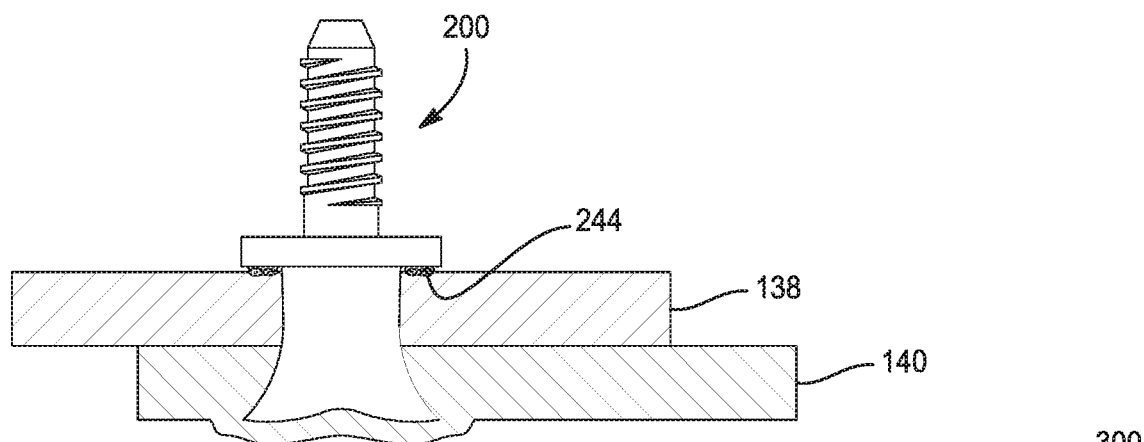
FIG. 5
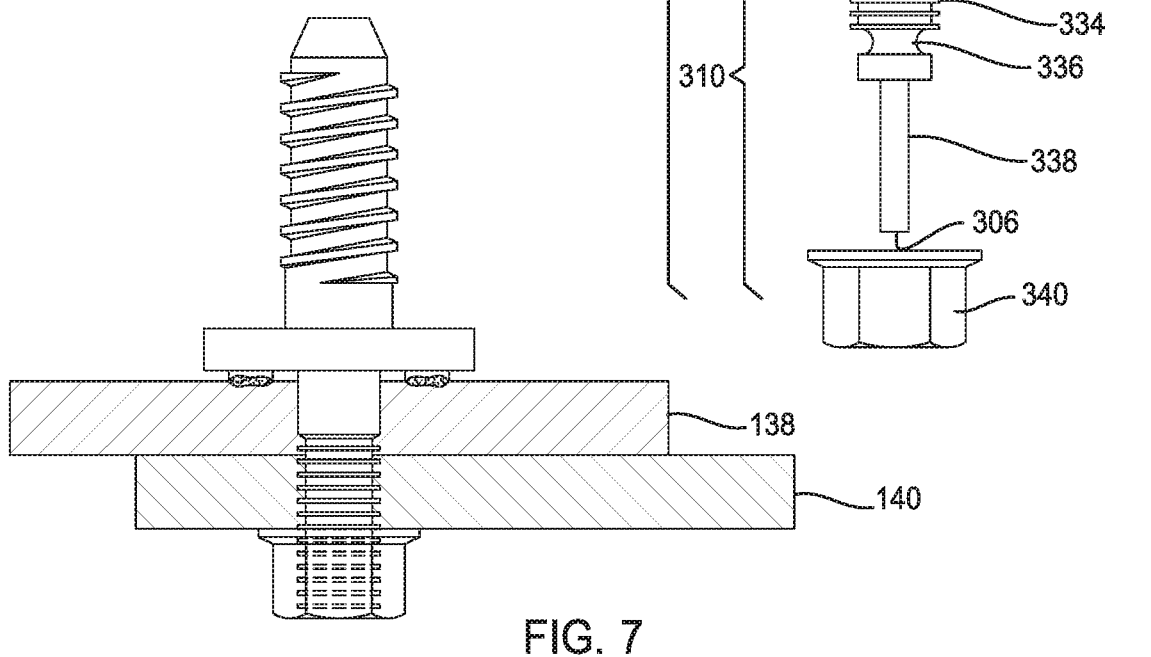
FIG. 6
FIG. 7

DOUBLE-ENDED DUAL ATTACHED FASTENER

The present disclosure relates to fasteners for a vehicle, more particular to double-ended fasteners for attaching a component to a panel member of the vehicle.

Fasteners having a stud end are used to provide secured connections to anchor vehicle components to relatively thin panel members on the vehicle. An example of a relatively thin panel member is that of a steel panel of the vehicle having suffice structural strength and rigidity to support and anchor a vehicle component. Examples of typical vehicle components may include safety components such as seat belts, air bags, attachment points for child seats, or larger components such as occupant seats. A vehicle component attached to one end of the fastener, which is typically a stud or stud-like member, and the other end of the fastener is anchored to the thin panel member. The strength of the fastener and the strength of the anchored, or attachment end, of the fastener to the steel panel need to withstand a sudden application of force, such as a force experienced during a sudden deceleration of the vehicle upon impact, in order to retain the attached vehicle component in place.

The stud or stud-like member of the fastener is typically inserted through an opening defined in the vehicle panel from rear of the vehicle panel. The fastener typically includes a flanged surface that is abutted against the rear surface of the vehicle panel. The flange surface is spot welded to the rear surface of the vehicle panel thus cooperating with the vehicle panel to retain the fastener in place and to prevent the fastener from being pulled through the vehicle panel. An additional panel member of metal may be sandwiched between the rear surface of the vehicle panel and the flange of the fastener to provide additional structural integrity for anchoring vehicle components. The flange of the fastener is spot welded to the additional panel member of metal or spot welded through both the vehicle panel and additional panel member of metal.

While current fasteners having a stud-like attached end achieve their intended purpose, the installation of the stud-like fastener is labor and material intensive resulting in additional complexity and cost in the manufacturing of the motor vehicle. Thus, there is a need for a new and improved fastener having a stud end for attaching a component to a panel of a motor vehicle.

SUMMARY

According to several aspects, a fastener is disclosed. The fastener includes a central shank extending along a longitudinal axis; a flange partitioning the central shank into a first shank portion and a second shank portion, wherein the flange includes an interior surface facing the second shank portion; and at least one weld projection extending from the interior surface of the flange.

In an additional aspect of the present disclosure, the interior surface of the flange is a flat annular surface perpendicular to the axis.

In another aspect of the present disclosure, the at least one weld projection includes a semi-spherical portion.

In another aspect of the present disclosure, the at least one of weld projections includes a cylindrical portion having a first end integral with the interior surface of the flange and an opposite second end integral with the semi-spherical portion.

In another aspect of the present disclosure, the fastener further includes at least three weld projections evenly radially spaced on the flat annular surface.

In another aspect of the present disclosure, the at least one weld projection is an annular ring concentric with the axis.

In another aspect of the present disclosure, the first shank portion defines a stud bolt.

In another aspect of the present disclosure, the second shank portion defines a friction screw, self-piercing rivet, or swage bolt.

According to several aspects, a dual attached fastener is disclosed. The dual attached fastener includes a first portion having a stud bolt; a second portion configured to anchor to a member panel, wherein the second portion extends in a direction opposite the first portion; a flange member partitioning the first end and the second end, wherein the flange member includes a flat interior surface facing the second portion; and at least one weld projection extending from the flat interior surface of the flange member toward the second portion.

In an additional aspect of the present disclosure, the flat interior surface of the flange member is an annular flat surface, and wherein the at least one weld projection is an annular ring concentrically disposed on the annular flat surface.

In another aspect of the present disclosure, the at least one weld projection includes at least three projections radially spaced on the flat interior surface.

In another aspect of the present disclosure, the second portion comprises a fastener selected from a group of fasteners consisting of a friction screw, a self-piercing rivet, and a swage bolt.

In another aspect of the present disclosure, the flange member includes an exterior surface defining a torque receiving member, and wherein the second portion comprises a self-tapping friction screw.

According to several aspects, a doubled-ended dual attached fastener is disclosed. The double-ended dual attached fastener includes a central shank extending along a longitudinal axis and a flange nut partitioning the central shank into a first shank portion defining a stud bolt and a second portion configured to be insertable through a front surface of a panel member. The first shank, flange nut, and second portion is a single integral unit. The flange nut includes an interior annular surface facing the second portion and perpendicular to the longitudinal axis, and an exterior surface defining a torque receiving member. The interior annular surface includes a plurality of radially spaced weld projections extending parallel to the longitudinal axis toward the second portion.

In an additional aspect of the present disclosure, the weld projection includes a material that amendable to form a solid-state weld joining the flange nut to a panel member through which the second portion is inserted.

In another aspect of the present disclosure, the second portion defines a fastener selected from a group consisting of a self-tapping friction screw, a self-piercing rivet, and a swage bolt.

In another aspect of the present disclosure, the second portion defines a self-tapping friction screw comprising of a convolution of sharp crested male threads and a sharpened tip terminating at distal end of the second portion.

In another aspect of the present disclosure, the weld projection includes a semi-circular cross-section.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a schematic side view of a first embodiment of a dual attached fastener having a stud end;

FIG. 2A is a schematic end view of the dual attached fastener of FIG. 1 as taken along line 2-2;

FIG. 2B is an alternative embodiment of the end view of the dual attached fastener of FIG. 1 as taken along line 2-2;

FIG. 3A-3C is a schematic illustration of a process of fastening the dual attached fastener of FIG. 1 to two panel members;

FIG. 5 is a schematic side view of the second embodiment of the dual attached fastener of FIG. 4 fastened to two panel members;

FIG. 6 is a schematic side view of a third embodiment of a dual attached fastener having a stud end; and FIG. 7 is a schematic side view of the third embodiment of the dual attached fastener of FIG. 6 fastened to two panel members.

DETAILED DESCRIPTION

Figure 3B:
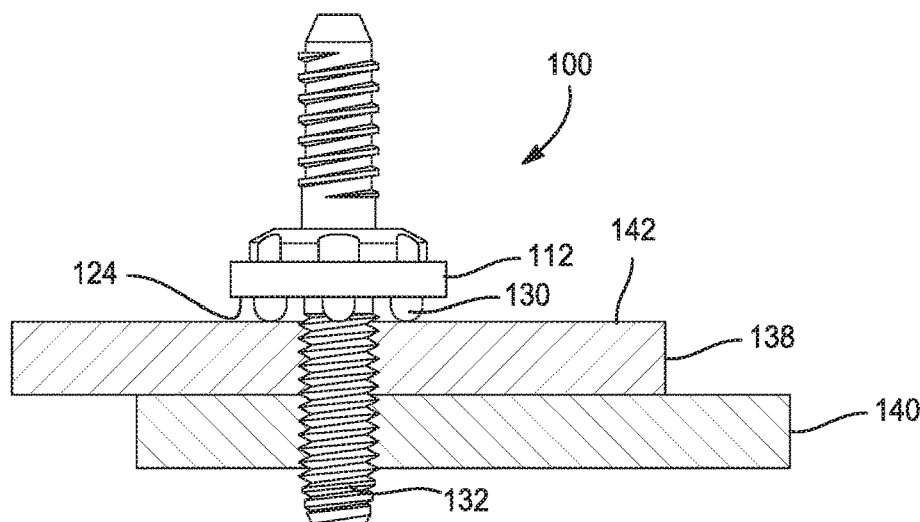

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not to be interpreted as limiting, but as a representative basis for teaching one skilled in the art as to how to practice the disclosed concepts.

FIG. 1 shows side view of a first embodiment of a double ended dual attached fastener having a stud end, indicated generally by reference numeral 100. The first embodiment of the dual attached fastener is also referred to as a friction screw dual attached fastener (dual attached fastener 100). The dual attached faster 100 includes a central shank 102 extending along an A-axis and includes a first distal end 104 and a second distal end 106 opposite the first distal end 104. The central shank 102 is partitioned into a first shank portion 108 and a second shank portion 110 by an intermediate flange nut 112. The first shank portion 108, the second shank portion 110, and the flange nut 112 are coaxially arranged on the A-axis. The flange nut 112 is integral with the central shank 102 such that the central shank 102, including the first and second shank portions 108, 110, rotates with the flange nut 112 on the A-axis when a sufficient torque is applied to the flange nut 112.

The first shank portion 108 defines a stud end 116 extending between the flange nut 112 and the first distal end 104 of the central shank 102. The stud end 116 is cylindrical in shape having a chamfered edge 118 adjacent the first distal end 104. The stud-end 116 includes a convolution of external threads 120, also known as male threads, configured to engage the female threads of a vehicle component (not shown).

The flange nut 112 includes a first surface 122 facing the first distal end 104 and an opposite second surface 124 facing the second distal end 106 of the central shank 102. The first surface 122 is also referred to an an exterior surface 122 and the second surface 124 is also referred to an interior surface 124. The first surface 122 defines a torque receiving member 126 such as hexagonal bolt nut for receiving a torque T for rotating the central shank 102 on the A-axis. The second surface 124 defines a flat annular surface 128 perpendicular to the A-axis. A plurality of weld projections 130 extends from the flat annular surface in a direction parallel with the A-axis.

Referring to FIG. 2A, the plurality of weld projections 130 are equally circumferentially spaced on the flat annular surface 128. The weld projections 130 are semi-spherical in shape or cylindrical in shape having a semi-spherical end. Alternatively, referring to FIG. 2B, a single annular weld projection 132, also referred to as an annulus, is shown protruding from the flat annular surface 128. The weld projections may be formed of the same material as the flange nut 112 or material having a lower melting temperature than the melting temperature of the flange nut 112 and suitable for welding the flange nut to a metallic panel member.

Referring back to FIG. 1, the second shank portion 110 defines a self-tapping friction screw 132 between the flange nut 112 and the second distal end 106 of the central shank 102. The self-tapping friction screw 132 includes a convolution of sharp crested male threads 134. The convolution of sharp crested male treads 134 terminates in a sharpened tip 136 at the second distal end 106 of the central shank 102. The sharpened tip 136 is configured to pierce through at least one panel member when a sufficient axial forces F is applied to the central shank 102. The sharp crested male threads 134 are configured to drive into the metallic panel member as a torque is applied to the flange nut 112.

Figure 3C:
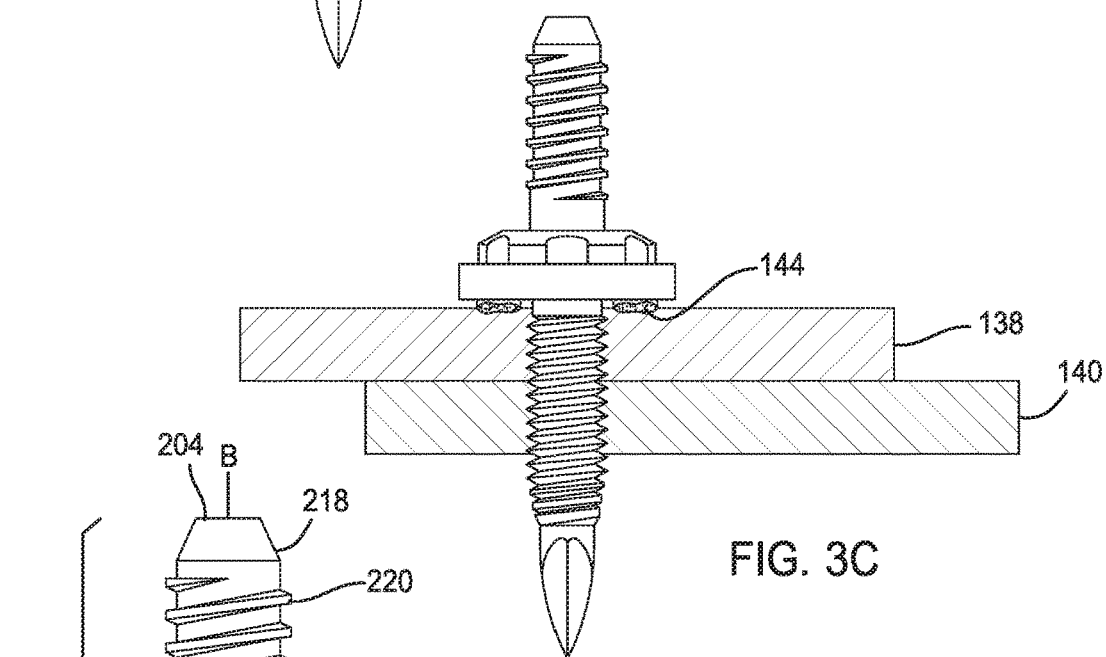

FIG. 3A-3C shows the process of installing the dual attached fastener 100 to a first and second panel members 138, 140, such as two steel panel members. The two panel members provide greater structural integrity to anchor the dual attached fastener 100 as compared to a single panel member. While two panel members are shown as an example, it is understood that the dual attached fastener 100 may also be attached to a single panel member or multiple panel members.

Referring to FIG. 3A, a sufficient axial force F is applied to the flange nut 112 to drive the sharpened tip 136 through surface of the first panel member 138 such that the convolution of sharp crested male threads 134 are in contact with at least the first panel member 138. A torsional force T is applied to the flange nut 112 such that the convolution of sharp crested male threads 134 drives the friction screw 132 and through the first and second panel members 138, 140.

Referring to FIG. 3B, the friction screw 132 is driven through the first and second panel member 138, 140 until the weld projections 130 extending from the second surface 124 of the flange nut 112 are in contact with a first surface 142 of the first panel member 138. A sufficient axial force F is applied to the dual attached fastener 100 to ensure that the weld projections 130 are in intimate contact with the first surface 142. An electric current is passed from electrodes (not shown) in the to the weld projections 130, where the concentration of high amperage electric current causes the weld projections 130 to be heated to a temperature sufficient to weld the flange nut 112 to the first panel member 138 by forming a solid-state or fusion weld joint. The welding process is aided and facilitated by the application of a suitable mechanical force F or pressure on the flange nut 112 to press the weld projections 130 tightly against the first surface 142 of the first panel member 138.

Referring to FIG. 3C, the dual attached fastener 100 is fixed to the first and second panel members 138, 140 and held in position by the friction screw 132 and the flange nut 112 welded to the first panel member 138. The friction screw 132 is the primary means of attachment and the weld joint 144 is the secondary means of attachment, thus dual attached to the panel members 138, 140. The weld serves the purpose of preventing the friction screw portion from unscrewing and/or from being axially pulled from the metallic panel members 138, 140.

Figure 4:
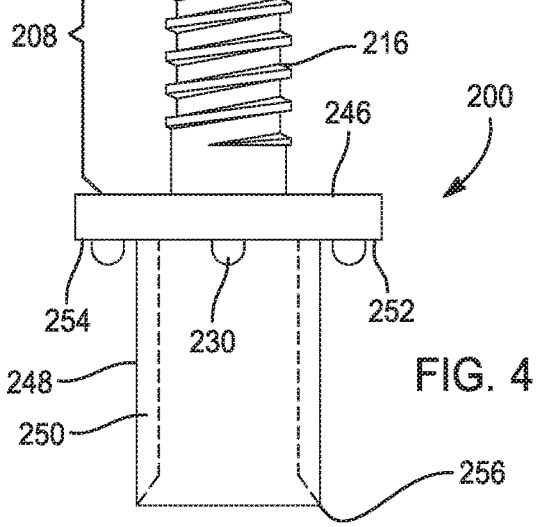
FIG. 4 is a schematic side view of a second embodiment of a dual attached fastener having a stud end.

FIG. 4 shows side view of a second embodiment of a double-ended dual attached faster, indicated generally by reference numeral 200. The second embodiment of the dual attached fastener is referred to herein as a self-piercing rivet (SPR) dual attached fastener having a stud end (SPR dual attach fastener 200).

Similar to the first embodiment of the dual attachment 100, the second embodiment of the dual attach fastener 200 includes a first shank portion 208 extending along a B-axis and defining a stud end 216. The stud end 216 includes a first distal end 204 having a chamfered edge 218 and an opposite end integral with a head 246 of a self-piercing rivet 248. The self-piercing riving 248 includes a hollow shell 250 of a cylindrical shape having one end closed by the head 246 of the self-piercing rivet 248. The head 246 of the self-piercing rivet 248 includes an overhanging portion 252 defining an annular surface 254 perpendicular to the B-axis. The annular surfaces 254 is facing a distal end 256 of the cylindrical shell 250, which terminates into a tapered circumferential edge. The head 246 is shown with a smooth surface, but it should be appreciated that the head 246 may include a square or triangular shape.

Similar to the first embodiment 100, the plurality of weld projections 230 are equally spaced on the flat annular surface 254 of the rivet head 246. The weld projections 230 are semi-spherical in shape or cylindrical in shape having a semi-spherical end. Alternatively, the weld projections 230 may be a single projection defining an annulus projecting from the annular flat surface as shown in FIG. 2. The weld projections or annulus may be formed of the same material as the flange or material having lower melting temperature than the melting temperature of the rivet head 246 suitable for welding the rivet head 246 to a metallic panel of a vehicle.

Referring to FIG. 5, a ram and rivet die (not shown) are used to drive the self-piercing rivet 248, tapered circumferential edge end first, into two or more panel members 138, 140. The self-piercing rivet 248 is formed of a material that is harder than the substrate (panel members 138, 140). For example, steel self-piercing rivets can be used to rivet aluminum alloys. The rivet die bends the hollow shell 250 outwardly so as to lock the self-piercing rivet 248 in position with respect to the panel members 138, 140 such as to prevent the rivet's removal from the panel members 138, 140 and, as a result, fixing the SPR dual attach fastener 200 to the panel members.

Similarly to the first embodiment, an axial force is applied to the self-piercing rivet 248 while an electric current is passed from electrodes (not shown) in the most direct or least resistance path to the weld projections, where the concentration of high amperage electric current causes the weld projections to be heated to welding temperature and welding the head of the rivet to the first member 138. The welding process is aided and facilitated by the application of a suitable mechanical force or pressure on the head 246 of the rivet to press the welding projections tightly against the surface of the first member 138. The rivet is the primary means of attachment and the weld is the secondary means of attachment to the panel members 138, 140. The welded projections serve the purpose of preventing the rivet from being axially pulled from the first and second panel members 138, 140.

Alternatively, the self-piercing rivet 248 may be formed of a composite material, such as a polymer composite, and the panel members 138, 140 may also be of a composite material. In which case, ultra-sonic welding may be used to join the weld projections onto the first panel member 138.

FIG. 6 shows side view of a third embodiment of a double-ended dual attached faster, indicated generally by reference numeral 300. The third embodiment of the dual attached fastener is referred to herein as a swage bolt dual attached fastener having a stud end (dual attach fastener 300).

The dual attached faster 300 includes a shank 302 having a first distal end 304 and a second distal end 306. The central shank 302 extends along a C-axis and is partitioned into a first shank portion 308 and a second shank portion 310 by an intermediate flange 312. The first shank portion 308, the second shank portion 310, and the flange 312 are coaxially arranged.

The first shank portion 308 defines a stud-end 316 extending between the flange 312 and a first distal end 304 of the central shank 302. The stud-end 316 is cylindrical in shape having a chamfered edge 318 adjacent the first distal end 304 of the central shank 302. The stud-end 316 includes a convolution of external threads 320, also known as male threads. The second shank portion 310 defines swaged collar stud 332 having peripheral grooved portion 334, a breakneck groove 336, and pin tail 338. A separate collar 340 adapted to engage the peripheral groove portion 334 of the collar stud 332 is provided.

The intermediate flange 312 includes a first surface 322 facing the first shank portion 308, or stud-end, and an opposite second surface 324 facing the second shank portion 310. The second surface 324 defines a flat annular surface 328 perpendicular to the C-axis. A plurality of weld projections 330 extends from the flat annular surface 328 in a direction parallel with the C-axis. The weld projections 330 are semi-spherical in shape having a semi-circular cross section or cylindrical in shape having a semi-spherical end. Alternatively, the weld projection 330 may be a single projection defining an annulus projecting from the annular flat surface, as shown in the example of FIG. 2B. The weld projections 330 may be formed of the same material as the flange or material having lower melting temperature than the melting temperature of the intermediate flange 312.

Referring to FIG. 7, during the installation process after the collar stud 332 is inserted through an opening defined through the two panel members 138, 140, a tool (not shown) engages and pulls on the pintail 338 while urging the collar 340 into position in the peripheral grooved portion 334 adjacent the second panel member 140. The two panel members 138, 140 are pulled together and the collar 340 is progressively locked, also referred to as swaged, into the grooved portion 334 of the swage collar stud 332. The grooved portion 334 and swaged collar 340 combine to form the installed fastener. The installation process stretches the pin and the pin is broken off after assembly.

Similarly to the first embodiment and second embodiment, heat is applied to the assembly to weld the projections 330 to the first member 138. The swage bolt 332 is the primary means of attachment and the welded projections 330 are the secondary means of attachment to the metallic panel members 138, 140. The welded projections 330 serve the purpose of preventing the swage bolt 332 from being axially pulled from the panel members 138, 140.

The disclosure has described certain preferred embodiments and modifications thereto. The above disclosed embodiments of the double-ended attach fasteners may be formed of steel or any metal or alloys having suitable strength. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

What is claimed is:

1. A fastener comprising,
a central shank extending along a longitudinal axis;
a flange partitioning the central shank into a first shank portion and a second shank portion, wherein the flange includes an interior surface facing the second shank portion; and
at least one weld projection extending from the interior surface of the flange;
wherein the at least one weld projection includes a semi-spherical portion and a cylindrical portion having a first end integral with the interior surface of the flange and an opposite second end integral with the semi-spherical portion.

2. The fastener of claim 1, wherein the at least one weld projection includes at least three weld projections evenly radially spaced on a flat annular surface.

3. The fastener of claim 1, wherein the first shank portion defines a stud bolt.

4. The fastener of claim 3, wherein the second shank portion defines a friction screw.

5. The fastener of claim 3, wherein the second shank portion defines a self-piercing rivet.

6. The fastener of claim 3, wherein the second shank portion defines a swage bolt.

7. A dual attached fastener, comprising:
a first portion comprising a stud bolt;
a second portion configured to anchor to a member panel, wherein the second portion extends in a direction opposite the first portion;
a flange member partitioning the first portion and the second portion, wherein the flange member includes a flat interior surface facing the second portion; and
at least one weld projection extending from the flat interior surface of the flange member toward the second portion, and
wherein the at least one weld projection includes a material that is amendable to form a solid-state weld joining the flange member to a metallic panel member.

8. The double-ended fastener of claim 7, wherein the flat interior surface of the flange member is an annular flat surface, and wherein the at least one weld projection is an annular ring concentrically disposed on the annular flat surface.

9. The dual attached fastener of claim 8, wherein the flange member includes an exterior surface defining a torque receiving member, and wherein the second portion comprises a self-tapping friction screw.

10. The dual attached fastener of claim 7, wherein the at least one weld projection includes at least three projections radially spaced on the flat interior surface.

11. The dual attached fastener of claim 10, wherein the second portion comprises a fastener selected from a group of fasteners consisting of a friction screw, a self-piercing rivet, and a swage bolt.

12. A doubled-ended dual attached fastener, comprising:
a central shank extending along a longitudinal axis;
a flange nut partitioning the central shank into a first portion defining a stud bolt and a second portion configured to be insertable through a front surface of a panel member,
wherein the stud bolt, flange nut, and second portion is a single integral unit,
wherein the flange nut includes an interior annular surface facing the second portion and perpendicular to the longitudinal axis, and an exterior surface defining a torque receiving member, and
wherein the interior annular surface includes at least one weld projection extending parallel to the longitudinal axis toward the second portion, and
wherein the at least one weld projection includes a material that is amendable to form a solid-state weld joining the flange nut to a metallic panel member through which the second portion is inserted.

13. The double-ended dual attached fastener of claim 12, wherein the second portion defines a fastener selected from a group consisting of a self-tapping friction screw, a self-piercing rivet, and a swage bolt.

14. The double-ended dual attached fastener of claim 12, wherein the second portion defines a self-tapping friction screw comprising of a convolution of sharp crested male threads and a sharpened tip terminating at distal end of the second portion.

15. The double-ended dual attached fastener of claim 14, wherein the at least one weld projection includes a semi-circular cross-section.

* * * * *